US011832002B2

(12) United States Patent
Numata

(10) Patent No.: US 11,832,002 B2
(45) Date of Patent: Nov. 28, 2023

(54) INFORMATION PROCESSING APPARATUS, INFORMATION PROCESSING METHOD, AND STORAGE MEDIUM FOR DISPLAYING A MEASUREMENT RESULT IN ACCORDANCE WITH A DIRECTION OF LUMINANCE CHANGES

(71) Applicant: CANON KABUSHIKI KAISHA, Tokyo (JP)

(72) Inventor: Aihiko Numata, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 115 days.

(21) Appl. No.: 17/506,301

(22) Filed: Oct. 20, 2021

(65) Prior Publication Data
US 2022/0150424 A1 May 12, 2022

(30) Foreign Application Priority Data

Nov. 10, 2020 (JP) ................................. 2020-187449

(51) Int. Cl.
H04N 25/53 (2023.01)
H04N 25/44 (2023.01)
H04N 25/77 (2023.01)

(52) U.S. Cl.
CPC ............. H04N 25/53 (2023.01); H04N 25/44 (2023.01); H04N 25/77 (2023.01)

(58) Field of Classification Search
CPC ...... H04N 5/353; H04N 5/345; H04N 5/3745; H04N 5/341
See application file for complete search history.

(56) References Cited

U.S. PATENT DOCUMENTS

2022/0150435 A1* 5/2022 Numata ............. H04N 1/00411
2022/0180840 A1* 6/2022 Kobayashi ............... G09G 5/02

FOREIGN PATENT DOCUMENTS

JP 2019134271 A 8/2019

* cited by examiner

Primary Examiner — Cynthia Segura
Assistant Examiner — Angel L Garces-Rivera
(74) Attorney, Agent, or Firm — CANON U.S.A., INC. IP Division

(57) ABSTRACT

An apparatus includes an acquisition unit configured to acquire a measurement result of a number of luminance changes, based on an address event signal indicating an address of a pixel having changed in luminance and a time, and a control unit configured to cause a relationship between the time and the measurement result to be displayed. The control unit causes the measurement result to be displayed in accordance with a direction of the luminance changes.

19 Claims, 10 Drawing Sheets

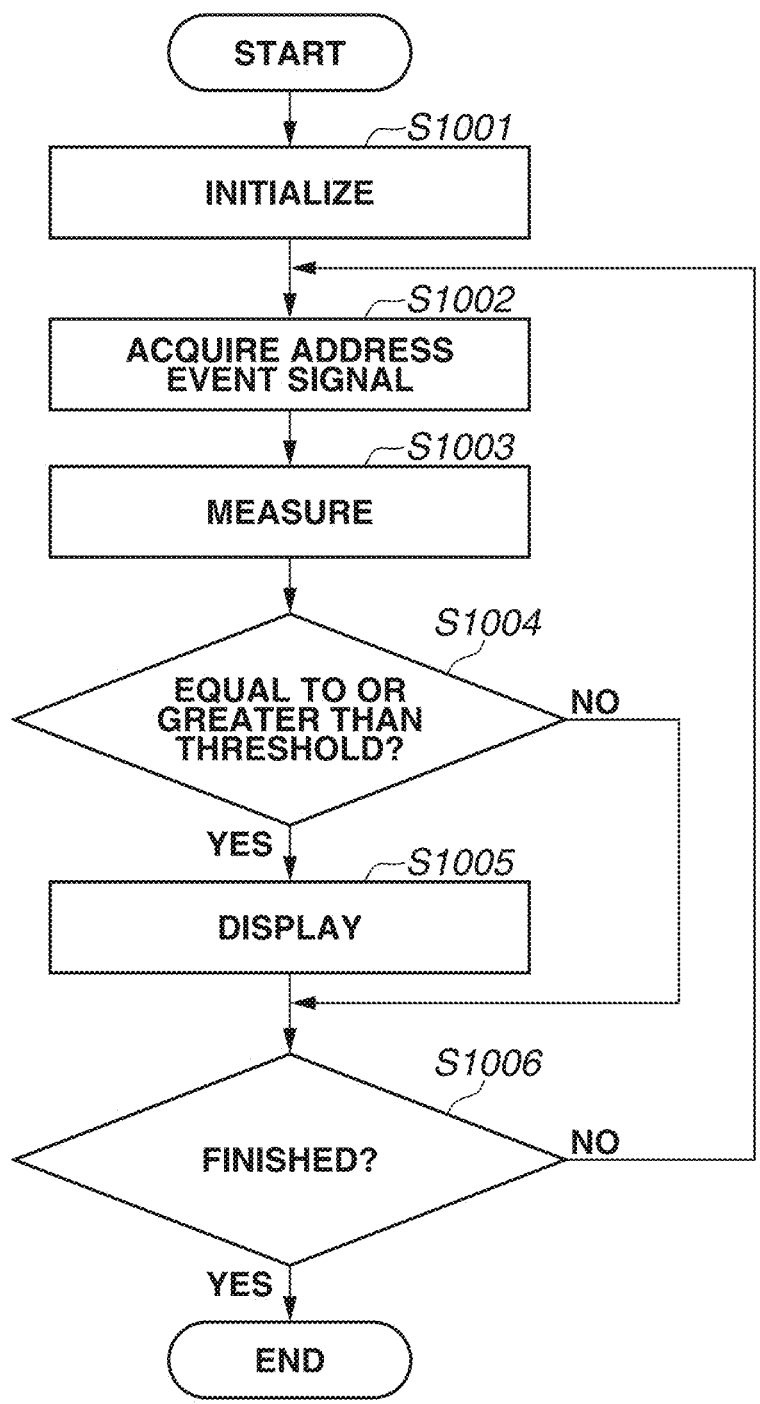

INFORMATION PROCESSING APPARATUS, INFORMATION PROCESSING METHOD, AND STORAGE MEDIUM FOR DISPLAYING A MEASUREMENT RESULT IN ACCORDANCE WITH A DIRECTION OF LUMINANCE CHANGES

BACKGROUND OF THE DISCLOSURE

Field of the Disclosure

The aspect of the embodiments relates to an event-based sensor.

Description of the Related Art

There is a known event-based sensor that outputs an address event signal indicating a change in the luminance of each pixel in real time (refer to Japanese Patent Application Laid-Open No. 2019-134271).

SUMMARY OF THE DISCLOSURE

According to an aspect of the embodiments, an apparatus includes an acquisition unit configured to acquire a measurement result of a number of luminance changes, based on an address event signal indicating an address of a pixel having changed in luminance and a time, and a control unit configured to cause a relationship between the time and the measurement result to be displayed, wherein the control unit causes the measurement result to be displayed in accordance with a direction of the luminance changes.

Further features of the disclosure will become apparent from the following description of exemplary embodiments with reference to the attached drawings.

BRIEF DESCRIPTION OF THE DRAWINGS

FIG. 10 is a flowchart describing processing executed by the information processing apparatus.

DESCRIPTION OF THE EMBODIMENTS

Hereinafter, information processing apparatuses in exemplary embodiments of the disclosure will be described with reference to the drawings. In the following description, the identical functions illustrated in all the drawings will be denoted with identical numbers, and duplicated description thereof will be omitted.

Figure 1:
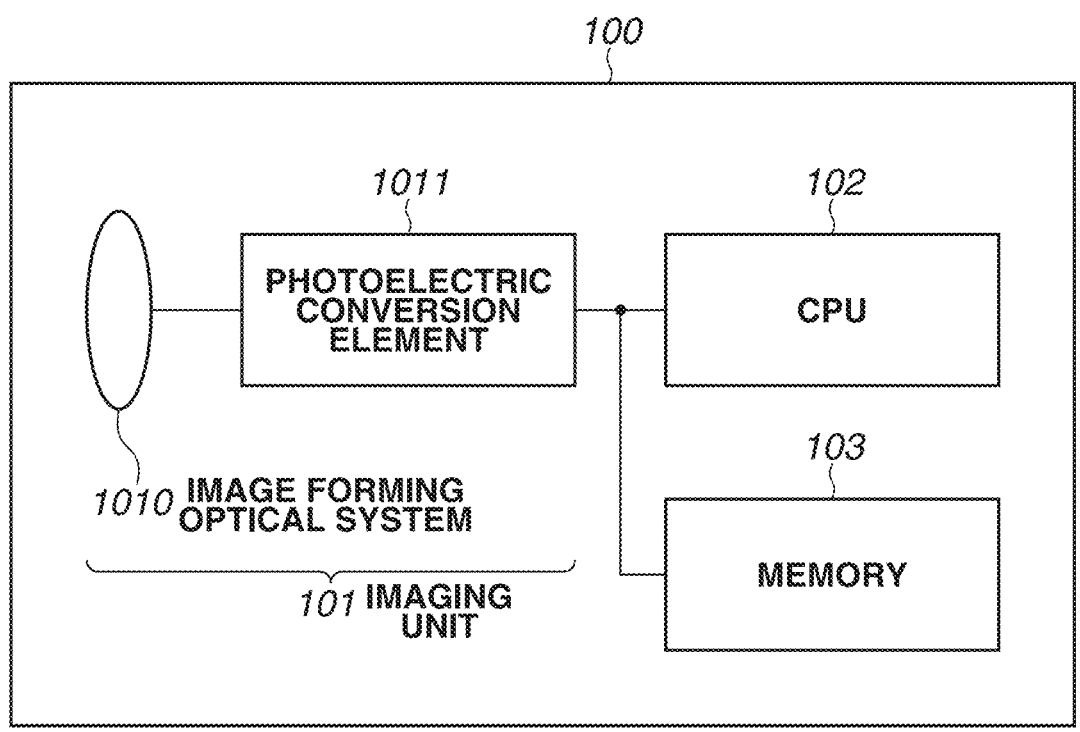
FIG. 1 is a block diagram illustrating an example of a hardware configuration of an information processing apparatus.

<Information Processing Apparatus: FIG. 1>

Hereinafter, a first exemplary embodiment will be described. FIG. 1 is a block diagram illustrating an example of a hardware configuration of an information processing apparatus. Referring to FIG. 1, an information processing apparatus 100 includes an imaging unit (an event-based sensor) 101 composed of an image forming optical system 1010 and a photoelectric conversion element 1011, a central processing unit (CPU) 102, and a memory 103. The imaging unit 101 outputs an address event signal according to received incident light. The image forming optical system 1010 is specifically a light receiving lens that receives incident light and forms an image on the photoelectric conversion element 1011. The photoelectric conversion element 1011 is specifically a single photon avalanche diode (SPAD) sensor or a complementary metal oxide semiconductor (CMOS) sensor that outputs an address event signal according to received incident light. The CPU 102 reads and executes an operating system (OS) or other programs stored in the memory 103 and controls connected components to perform arithmetic operations and logical judgments in various processes. The processing executed by the CPU 102 includes information processing according to the present exemplary embodiment. The CPU 102 controls driving of focus and of an aperture by the image forming optical system 1010, driving of the photoelectric conversion element 1011, and the like. The memory 103 is, for example, a hard disc drive or an external storage apparatus, which stores programs and various data related to the information processing in the present exemplary embodiment.

Figure 2:
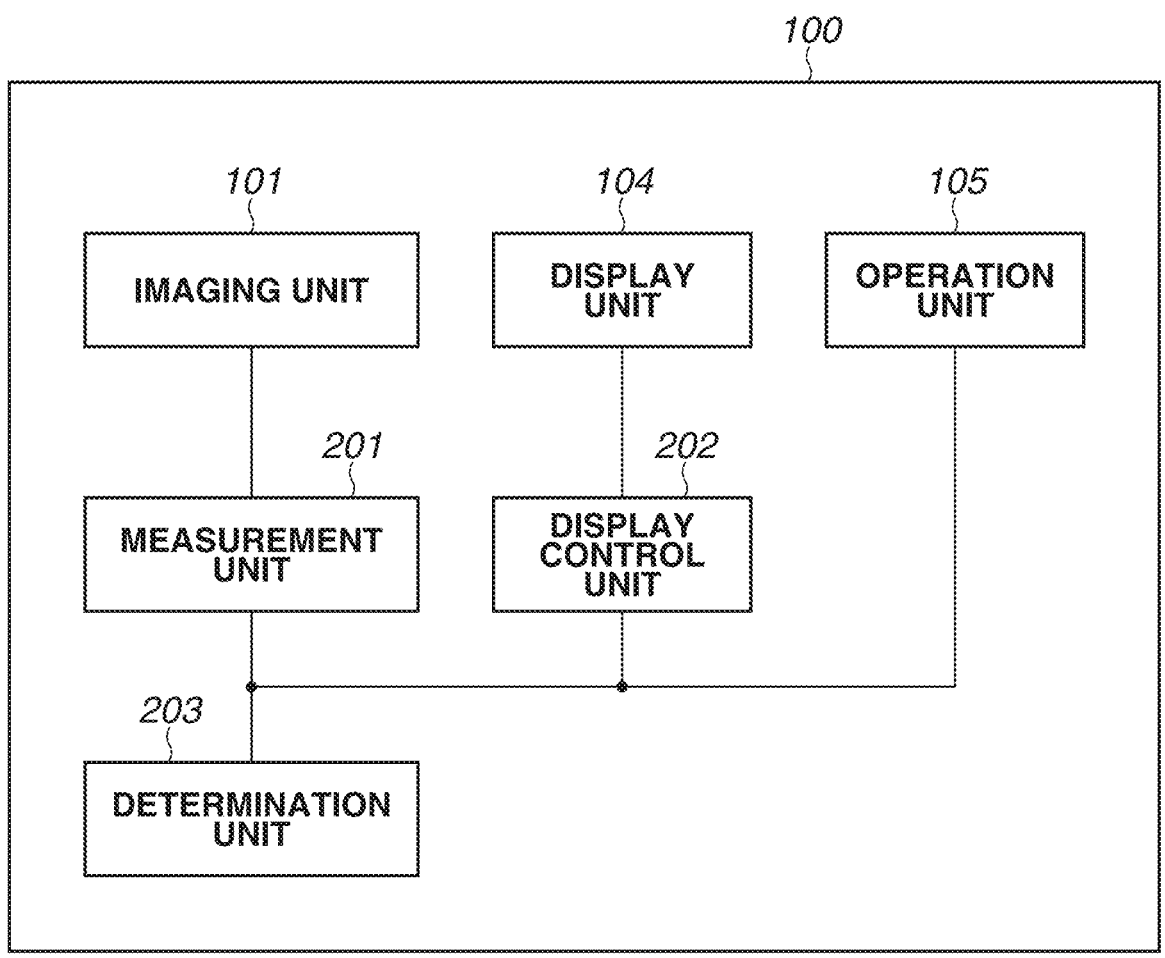
FIG. 2 is a block diagram illustrating a functional configuration example of the information processing apparatus.

A functional configuration example of the information processing apparatus 100 according to the present exemplary embodiment will be described with reference to FIG. 2. The information processing apparatus 100 includes the imaging unit 101, a measurement unit 201, a display control unit 202, a determination unit 203, a display unit 104, and an operation unit 105. The imaging unit 101 outputs an address event signal according to received incident light. More specifically, the imaging unit 101 outputs an address event signal indicating an address of a pixel where a change in luminance has occurred and the time of the change. The measurement unit 201 acquires a measurement result of the number of changes in luminance from the address event signals output from the event-based sensor 101. Based on the address event signals, the display control unit 202 causes the display unit 104 to display a graph indicating the time on a horizontal axis and the number of changes in luminance on a vertical axis. The measurement results here are separately displayed according to directions of changes in luminance. Specifically, the counting results of the number of pixels having changed in luminance in a positive direction is represented in a quadrant of Y>0 with reference to the horizontal axis (X=0). In addition, the counting results of the number of pixels having changed in luminance in a negative direction is represented in a quadrant of Y<0. The determination unit 203 determines whether the change in luminance at a certain time satisfies a predetermined condition. For example, the determination unit 203 determines whether the number of changes in luminance having occurred in a predetermined direction is equal to or greater than a predetermined threshold. The display unit 104 displays a graph indicating the time on the horizontal axis and the number of pixels having changed in luminance on the vertical axis. The display unit 104 can be, for example, an apparatus outside the information processing apparatus and can be a display apparatus such as a monitor or a projection apparatus such as a projector. The address event signals can be output in a mode other than display and, for example, can be output by sound. In that case, a speaker may be built in or connected to the information processing apparatus. The operation unit 105 accepts various instructions for image capture, display, and the like input by a user. The display unit 104 and the operation unit 105 can be composed of external apparatuses different from the information processing apparatus. Further, functional components of the information processing apparatus can include any components other than the above-described components.

Figure 3A:
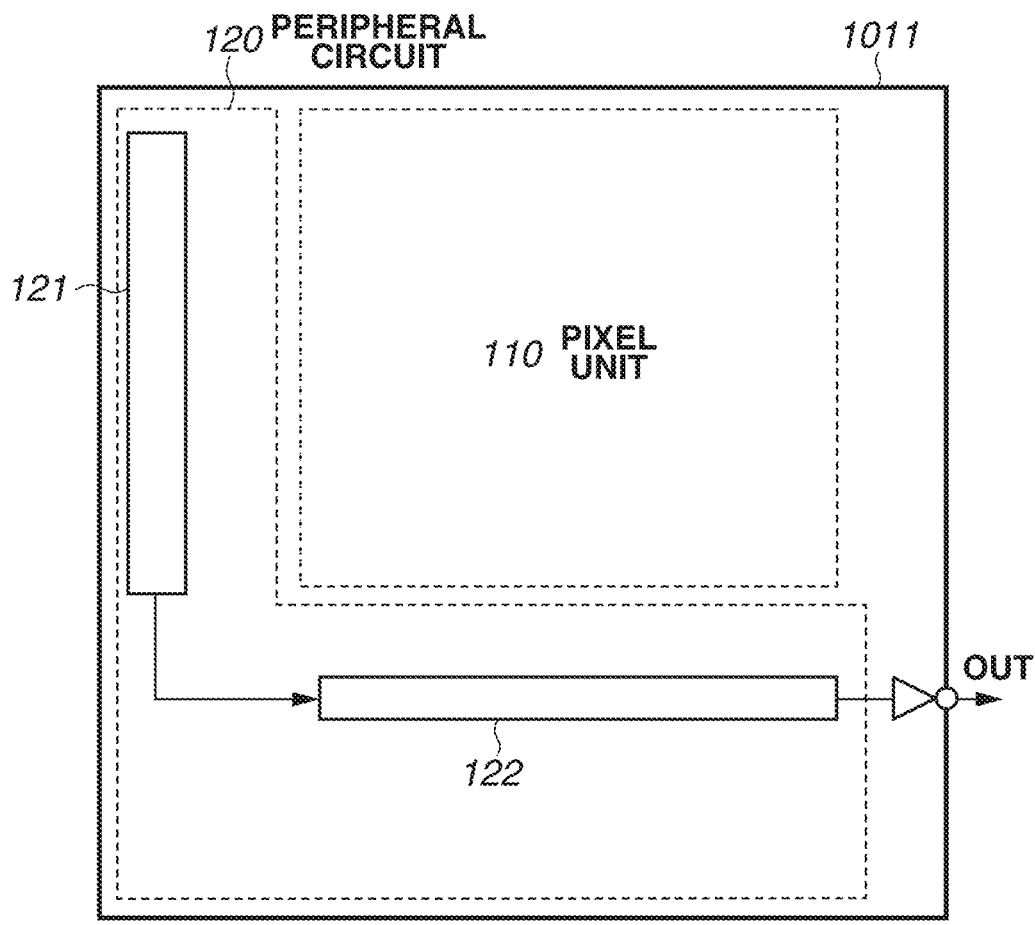
FIGS. 3A and 3B are each a diagram illustrating a configuration example of an event-based sensor.
Figure 3B:
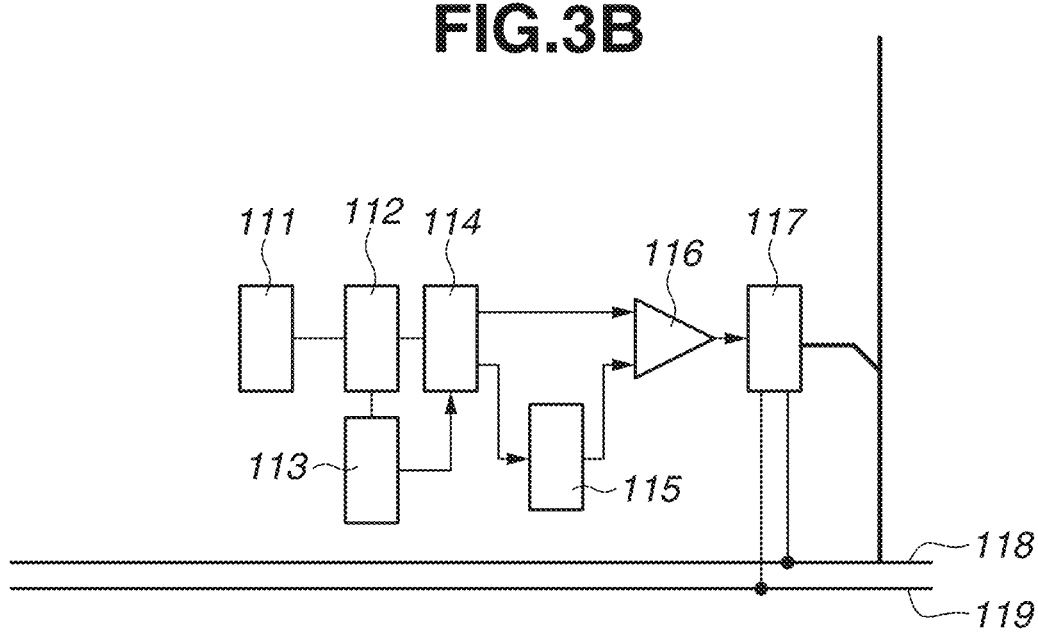

<Event-Based Sensor: FIGS. 3A and 3B>

An example of the event-based sensor 101 according to the present exemplary embodiment will be described. The event-based sensor 101 counts the number of incident photons and determines the timing when the number of counted photons has exceeded a predetermined threshold. The event-based sensor 101 also measures required time (the number of clocks) until the number of photons becomes equal to or greater than a first threshold, and detects a change in luminance by comparing the required times. Specifically, when the previously measured required time is designated as $T_0$ and the latest required time is designated as T, in a case where $T-T_0$ is equal to or greater than a second threshold, the event-based sensor 101 detects a change in luminance in the negative direction. In a case where $T_0-T$ is equal to or greater than the second threshold, the event-based sensor 101 detects a change in luminance in the positive direction. In a case where $T-T_0$ is smaller than the second threshold, the event-based sensor 101 detects no change in luminance. The second threshold takes on a value of zero or larger, which is preset or set according to other parameters.

Hereinafter, a detailed configuration will be described. FIG. 3A is a diagram illustrating a configuration example of the photoelectric conversion element 1011. The photoelectric conversion element 1011 includes a pixel unit 110 and a peripheral circuit 120. The peripheral circuit 120 includes a vertical arbitration circuit 121 and a horizontal read circuit 122.

FIG. 3B is a diagram illustrating a configuration example of the pixel unit 110 constituting the event-based sensor 101. The pixel unit 110 includes a photoelectric conversion unit 111, a pixel counter 112, a time counter 113, a first determination circuit 114, a memory 115, a comparator 116, a second determination circuit 117, a response circuit 118, and a selection circuit 119. The photoelectric conversion unit 111 includes an avalanche photodiode (SPAD) operating in the Geiger mode and is configured to count the number of photons incident on the photoelectric conversion unit 111 by the pixel counter 112. The time counter 113 counts the time when a photon has entered the photoelectric conversion unit 111. Configuring the event-based sensor 101 using the SPAD makes it possible to detect a change in the luminance of one photon. Detecting a change in the luminance of one photon makes it possible to acquire an address event signal even in a night-vision state during the night-time or the like.

When the number of photons counted by the pixel counter 112 has reached the first threshold, the first determination circuit 114 stops the time counting by the time counter 113. The memory 115 stores the past count values of the time counter 113. The memory 115 uses the comparator 116 to determine a differential count value between the current count value of the time counter 113 and the past count value of the time counter 113.

In a case where the differential count value is equal to or greater than the second threshold, the second determination circuit 117 sends a request signal to the vertical arbitration circuit 121 via the response circuit 118. The response circuit 118 receives, from the vertical arbitration circuit 121, a response indicating permission or non-permission of output of address event data. In a case where the differential count value is smaller than the second threshold, the second determination circuit 117 does not send a request signal.

When the response circuit 118 receives a response indicating permission of output, the selection circuit 119 outputs the count value of the time counter 113 to the horizontal read circuit 122. The horizontal read circuit 122 outputs the received count value as an output signal from the photoelectric conversion element 1011 to the memory 103.

The differential count value calculated by the comparator 116 corresponds to the reciprocal number of incidence frequency of photons, and thus the photoelectric conversion element 1011 according to the present exemplary embodiment has a function of measuring "a change in incidence frequency of photons", that is, a change in luminance. The photoelectric conversion element 1011 outputs an address event signal using the second determination circuit 117, only in a case where the difference in interval between the times when the number of incident photons reached the first threshold is equal to or greater than the second threshold. That is, the photoelectric conversion element 1011 is a type of a photoelectric conversion element that outputs the incidence frequency in a case where the difference in incidence frequency is equal to or greater than the second threshold, and that does not output the incidence frequency in a case where the difference in incidence frequency is smaller than the threshold. Such a configuration as described above realizes a photoelectric conversion element of an asynchronous type that detects a change in luminance as an address event in real time at each pixel address.

<Variations of Photoelectric Conversion Element>

In the above-described case, the photoelectric conversion element 1011 has an SPAD as the photoelectric conversion unit 111 to measure the times of incidence of photons to detect a change in incidence frequency of the photons. However, the photoelectric conversion element cannot be the one having the configuration as illustrated in FIG. 2, as far as it detects a change in luminance as an address event in real time. For example, as described in Japanese Patent Application Laid-Open No. 2019-134271, a photoelectric conversion element that detects a change in luminance as a change in voltage can be used.

<Measurement Unit 201>

The measurement unit 201 measures, from an address event signal output from the event-based sensor 101, the number of pixels where a change in luminance has occurred at a certain time. Specifically, the measurement unit 201 acquires the measurement results of the total number of pixels having changed in luminance in the positive direction and the total number of pixels having changed in luminance in the negative direction, which are independently measured within a specific time range.

The specific time range is a preset parameter, which can be a minimum time duration determined by the time resolution of the vertical arbitration circuit 121 in the photoelectric conversion element 1011 or can be specified as a longer time range by the user. The shorter time duration makes it possible to capture abnormal phenomena at higher speeds, whereas the longer time duration makes it easier to reduce an influence of an error such as random noise, thereby improving the accuracy of determination on the abnormality of phenomena.

<Display Control Unit 202>

The display control unit 202 causes the display unit 104 to display a graph generated based on the address event signal, which indicates the time on the horizontal axis and indicates the number of pixels having changed in luminance on the vertical axis. The information processing apparatus 100 according to the present exemplary embodiment separately displays the number of positive luminance changes $y_1$ and the number of negative luminance changes $y_2$. This allows the user to easily grasp the time when an abnormality has occurred.

Figure 4:
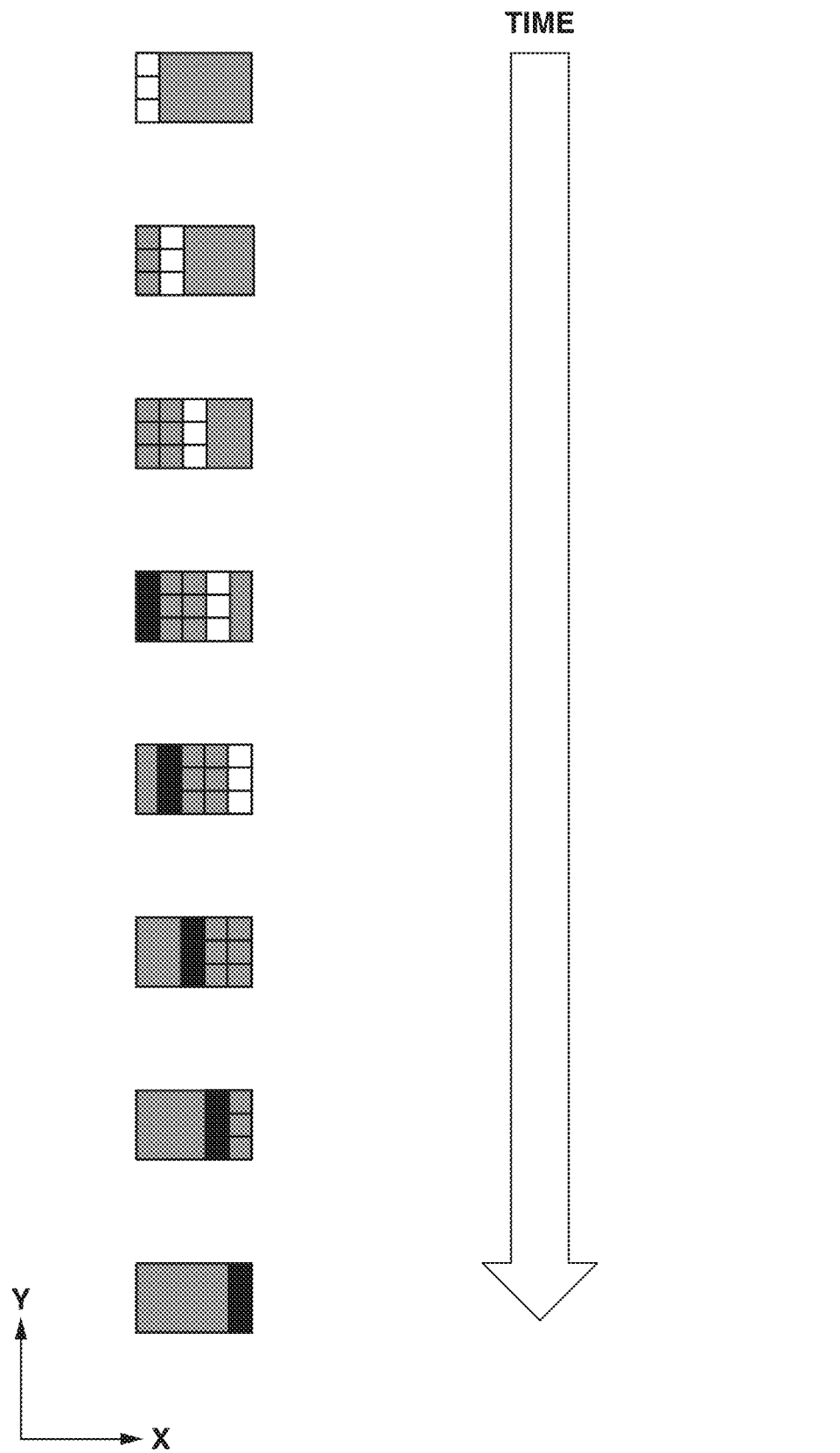
FIG. 4 is a diagram schematically describing outputs of the event-based sensor.

FIG. 4 schematically describes outputs of frame images of a subject captured by the information processing apparatus 100 using the event-based sensor 101. The subject is brighter than a background and is moving along a +X axis direction. FIG. 4 illustrates pixels with positive luminance changes equal to or greater than a threshold in white, pixels with negative luminance changes equal to or greater than the threshold in black, and pixels with luminance changes smaller than the threshold in gray. As seen from FIG. 4, a boundary between the subject and the background changes in luminance along with the movement of the subject. The pixels at a front side (+X side) of the subject, the luminance values of the pixels at the boundary change in the positive direction because the subject brighter than the background moves forward. On the other hand, the pixels at a back side (−X side) of the subject, the luminance values of the pixels at the boundary change in the negative direction because the background darker than the subject is imaged due to the movement of the subject. That is, in a case where the subject moves, the number of the pixels with positive luminance changes and the number of the pixels with negative luminance changes are detected to be almost the same under an ideal environment where photon shot noise and the like are ignored. In a case where the brightness of an imaged whole screen changes, luminance changes are more frequently detected in a direction of the luminance changes. On the other hand, in a case where the time is displayed on the horizontal axis and an integrated values of luminance changes in the whole screen are displayed on the vertical axis in a simple manner, it is difficult for the user to differentiate between the detection of a moving body and the changes in brightness of the whole screen.

Figure 5:
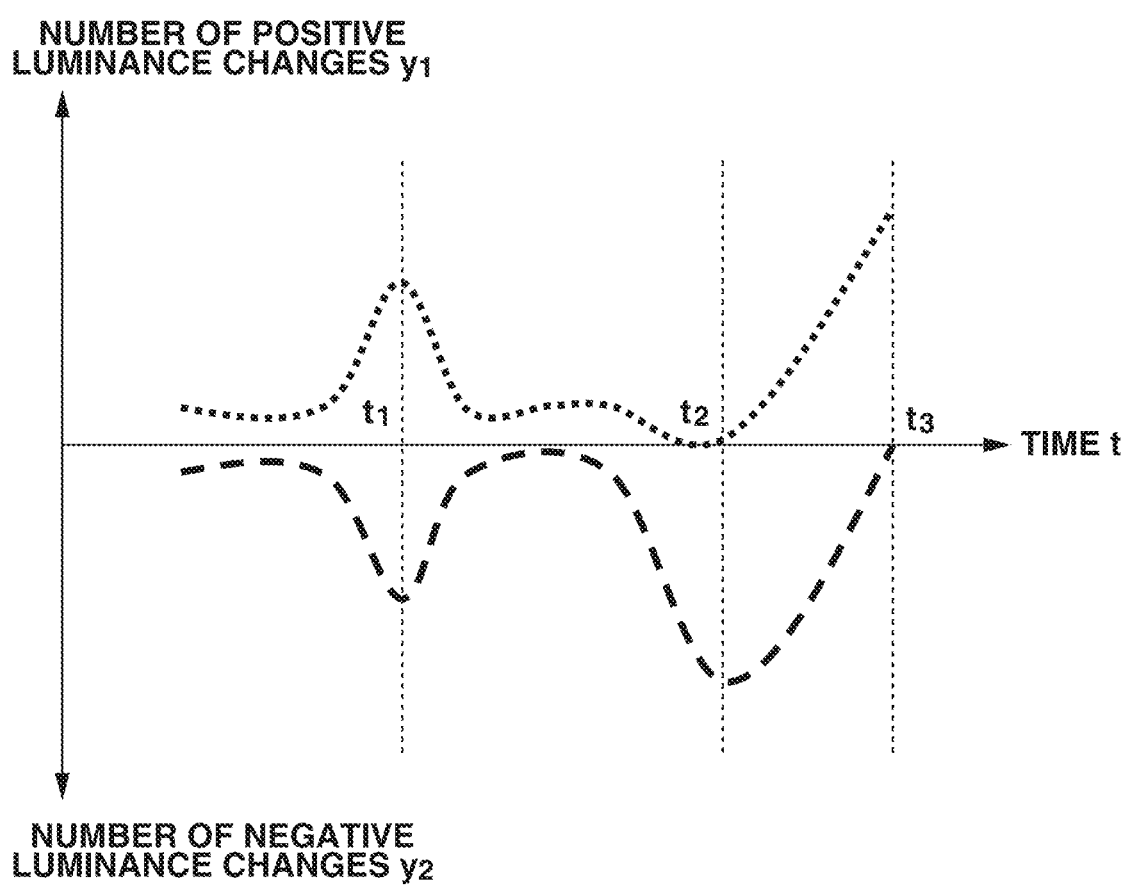
FIG. 5 is a diagram illustrating an example of display.

FIG. 5 is a diagram describing the display unit 104 of the information processing apparatus 100 in the disclosure. The horizontal axis indicates the time and the vertical axis separately indicates the number of positive luminance changes $y_1$ (a dotted line) and the number of negative luminance changes $y_2$ (a broken line). The outputs of the event-based sensor 101 do not represent positive changes or negative changes in a case where the subject does not move. On the other hand, the outputs of the event-based sensor 101 represent simultaneous positive changes and negative changes in a case where the subject moves. Accordingly, as illustrated in FIG. 5, separately displaying the number of positive luminance changes $y_1$ and the number of negative luminance changes $y_2$ allows the user to easily grasp the presence or absence of movement of the subject. For example, in a case of using an event-based sensor for constant monitoring, it is easy to specify the time when a moving body has been detected due to intrusion or theft. In FIG. 5, the horizontal axis indicates the time and the vertical axis indicates the number of luminance changes, but the respective indications of the vertical axis and the horizontal axis can be exchanged. Alternatively, instead of the orthogonal coordinate system, an oblique coordinate system can be used. That is, any coordinate system can be used as far as it displays the relationship between the time and the number of luminance changes on a display unit.

<Display of only Luminance Changes in Region of Interest>

With the number of positive luminance changes $y_1$ and the number of negative luminance changes $y_2$, all the luminance changes in the pixels of the whole screen can be displayed or only the luminance changes in some of the pixels can be displayed. In the case of using an event-based sensor for detection of intrusion or theft, it may be necessary that the presence or absence of an abnormal phenomenon is specified focusing on only luminance changes in a specific region such as an intrusion pathway. In such a use case, the luminance changes are counted only in a region specified in advance by the user and the count results are displayed on the display unit 104. This allows the user to efficiently grasp only the abnormalities having occurred in the region of interest. To specify the region of interest, the information processing apparatus 100 includes a user interface for the user to specify the region of interest.

<Removal of Random Noise>

In order to differentiate between luminance changes due to the photon shot noise and luminance changes due to the movement of the subject, in one embodiment, the luminance changes in a cluster of pixels are detected while the luminance changes in isolated pixels are not detected. That is, based on the address event signals, the measurement unit 201 measures luminance changes in a region larger than a predetermined size. Since the luminance changes due to the photon shot noise occur at random, detecting no luminance changes in isolated pixels makes it possible to differentiate between the luminance changes having occurred due to movement of the subject and the luminance changes having occurred due to noise.

The luminance changes in isolated pixels and the luminance changes in a cluster of pixels can be differentiated by the connectivity number. An address of a pixel having changed in luminance can be specified by an address event signal. For example, in the event of a luminance change in a pixel of interest, in a case where two or more of four neighboring pixels have luminance changes in the same direction, these pixels are determined to be connected. In a case where a cluster of connected pixels includes the number of pixels equal to or greater than a predetermined number (for example, 25 pixels), it is determined that luminance changes have occurred in the cluster of pixels.

(Modification 1)

An information processing apparatus having an event-based sensor can be used for detection of intrusion or theft. With the event-based sensor, the information processing apparatus can be used as a low-power-consumption monitoring system for detection of intrusion or theft because most of the pixels do not change in brightness without occurrence of intrusion or theft but change in brightness only in the event of an abnormality such as intrusion or theft. In such a use case, luminance changes lead to the detection of a moving body, whereby it can be assumed that an abnormality has occurred.

Hereinafter, a second exemplary embodiment will be described. The information processing apparatus 100 in the second exemplary embodiment is different from the first exemplary embodiment in luminance change information displayed on the display unit 104. This allows the user to grasp more easily the times of occurrences of events.

Figure 6:
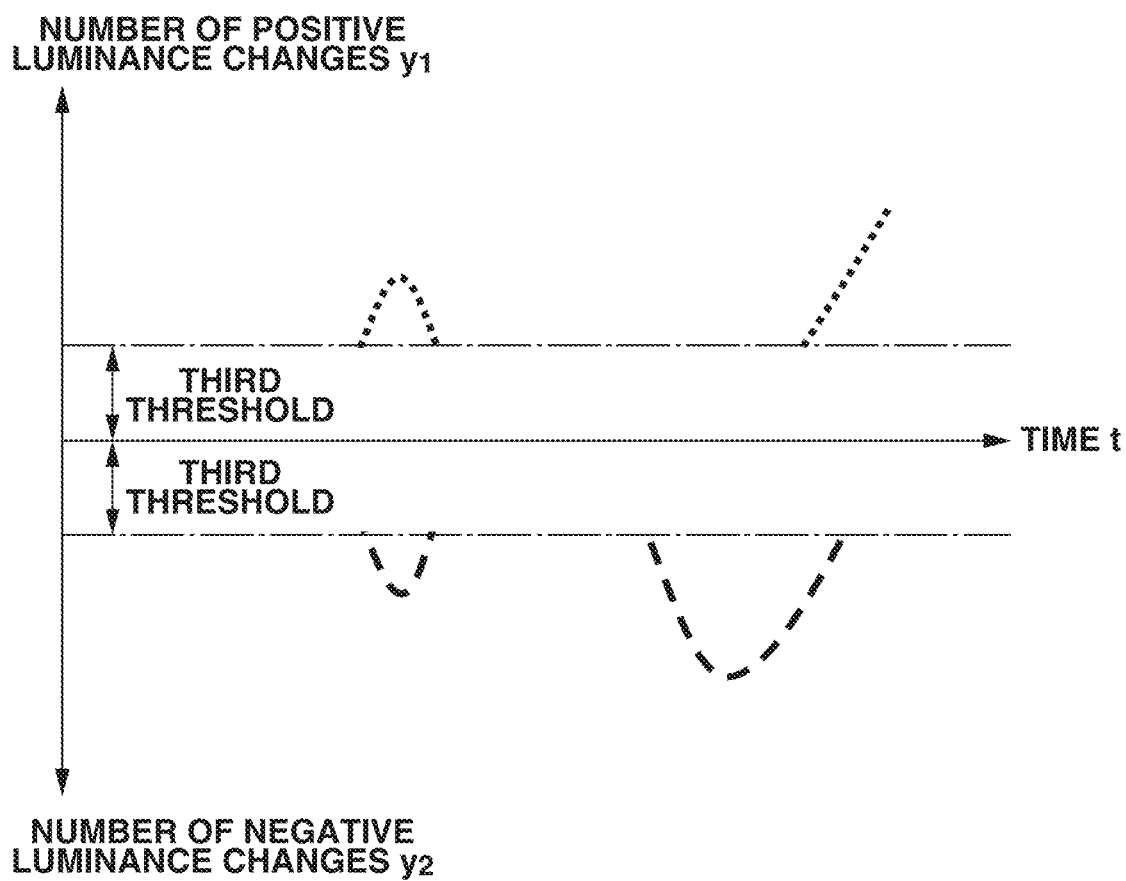
FIG. 6 is a diagram illustrating an example of display.

<Display of only Luminance Changes Equal to or Greater than a Threshold: FIG. 6>

FIG. 6 is a diagram illustrating an example of display on the display unit 104. FIG. 6 illustrates the number of luminance changes at the times of occurrences of events where an absolute value of the number of positive luminance changes $y_1$ is equal to or greater than a first threshold and an absolute value of the number of negative luminance changes $y_2$ is equal to or greater than the first threshold. This makes it possible to exclude luminance changes due to random noise and grasp only the times when the subject has greatly moved, which further facilitates grasping of the times of occurrences of events.

Alternatively, only luminance changes satisfying at least one of a condition that the absolute value of the number of positive luminance changes $y_1$ is equal to or greater than a third threshold and a condition that the absolute value of the number of negative luminance changes $y_2$ is equal to or greater than the third threshold can be displayed. Nevertheless, performing the determination based on both the absolute value of the number of positive luminance changes $y_1$ and the absolute value of the number of negative luminance changes $y_2$ makes it easier to grasp the times of occurrences of events.

Figure 7A:
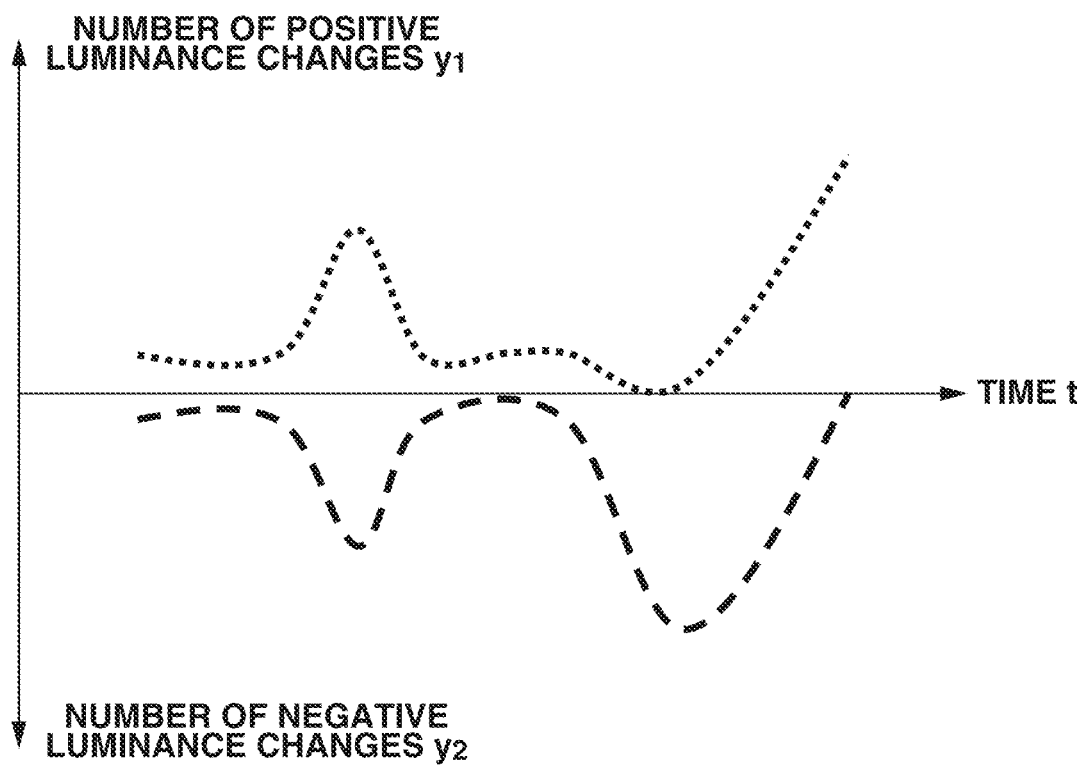
FIGS. 7A and 7B are each illustrating an example of display.
Figure 7B:
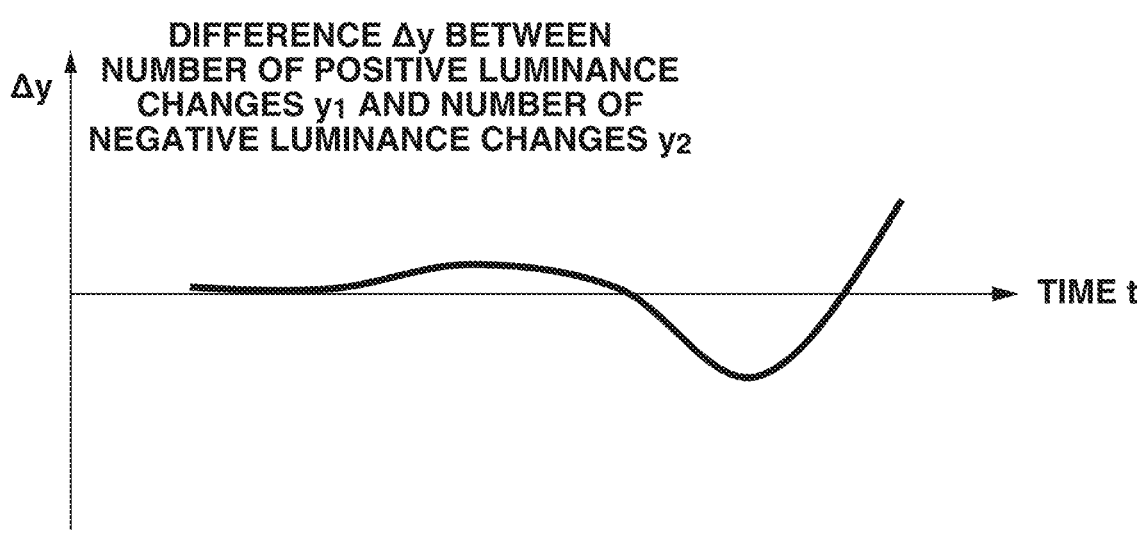

<Display of the Difference Between Positive and Negative Changes: FIGS. 7A and 7B>

FIGS. 7A and 7B are diagrams illustrating examples of display on the display unit 104. FIG. 7B illustrates an example of display of differences Δy between the number of positive luminance changes $y_1$ and the number of negative luminance changes $y_2$. FIG. 7A illustrates the number of positive luminance changes $y_1$ and the number of negative luminance changes $y_2$. This makes it possible to differentiate in an easy-to-understand fashion between the luminance changes due to the movement of the subject and the luminance changes due to variations in illumination of environmental light (the alteration of day and night in an outdoor location, turning on and off light in an indoor location, or the like). As a result, the user can easily grasp the times when the subject moved. Hereinafter, description of the luminance changes will be provided.

Figure 8:
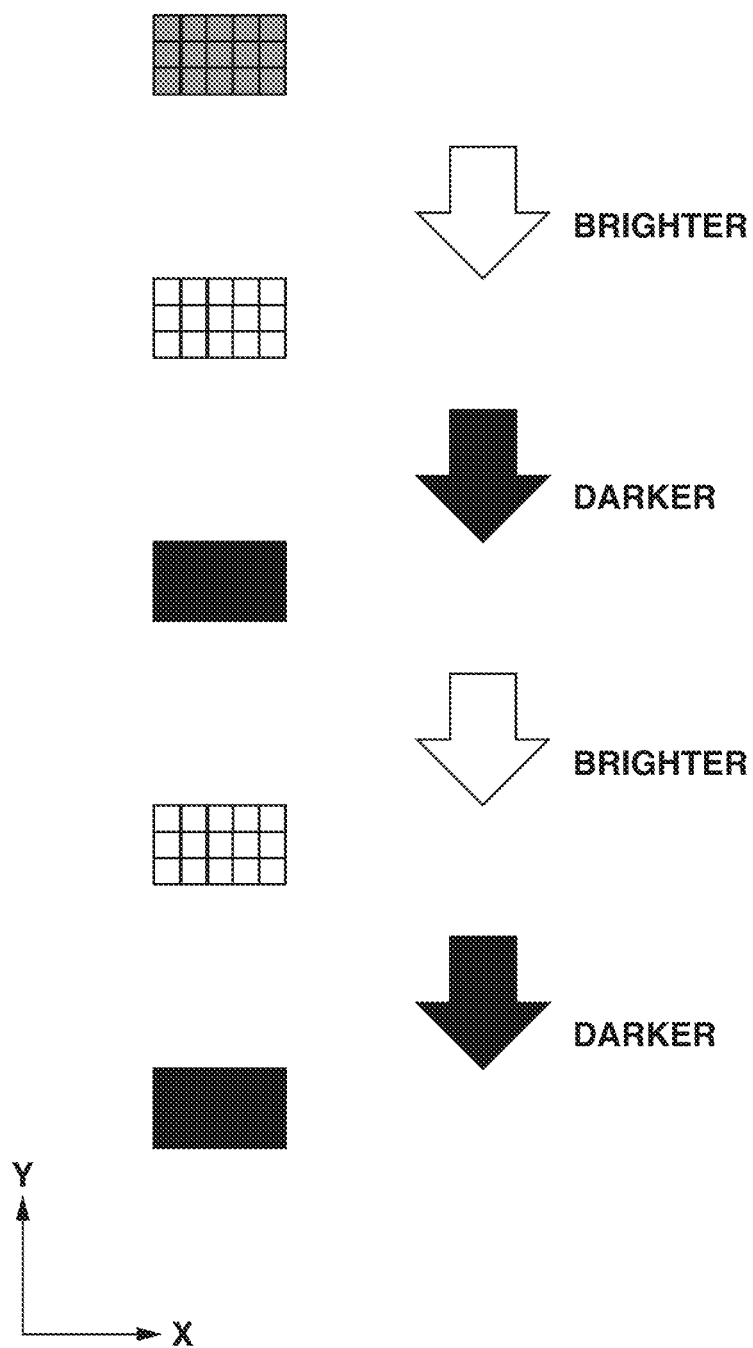
FIG. 8 is a diagram schematically describing outputs of the event-based sensor.

FIG. 8 schematically describes, as in FIG. 4, outputs of frame images in a case where the subject did not move and the illumination of environmental light gradually varies. As seen from FIG. 8, except for noise components, the luminance values of all the pixels change in the positive direction when the illumination of environmental light becomes brighter, and the luminance values of all the pixels change in the negative direction when the illumination of the environmental light becomes darker. Therefore, in a case where the illumination of environmental light varies, the difference between the number of positive luminance changes $y_1$ and the number of negative luminance changes $y_2$ greatly varies.

In contrast, as illustrated in FIG. 4, when the subject moves, except for noise components, the differences between the number of positive luminance changes $y_1$ and the number of negative luminance changes $y_2$ in the entire screen can be made close to zero.

As above, although there is commonality between the variations in the illumination of environmental light and the movement of the subject that the number of positive luminance changes $y_1$ and the number of negative luminance changes $y_2$ both greatly increase, the differences between the number of positive luminance changes $y_1$ and the number of negative luminance changes $y_2$ are greatly different. Therefore, displaying the differences between the number of positive luminance changes $y_1$ and the number of negative luminance changes $y_2$ allows the user to differentiate between the luminance changes due to the movement of the subject and the luminance changes due to variations in the illumination of the environmental light.

Figure 9A:
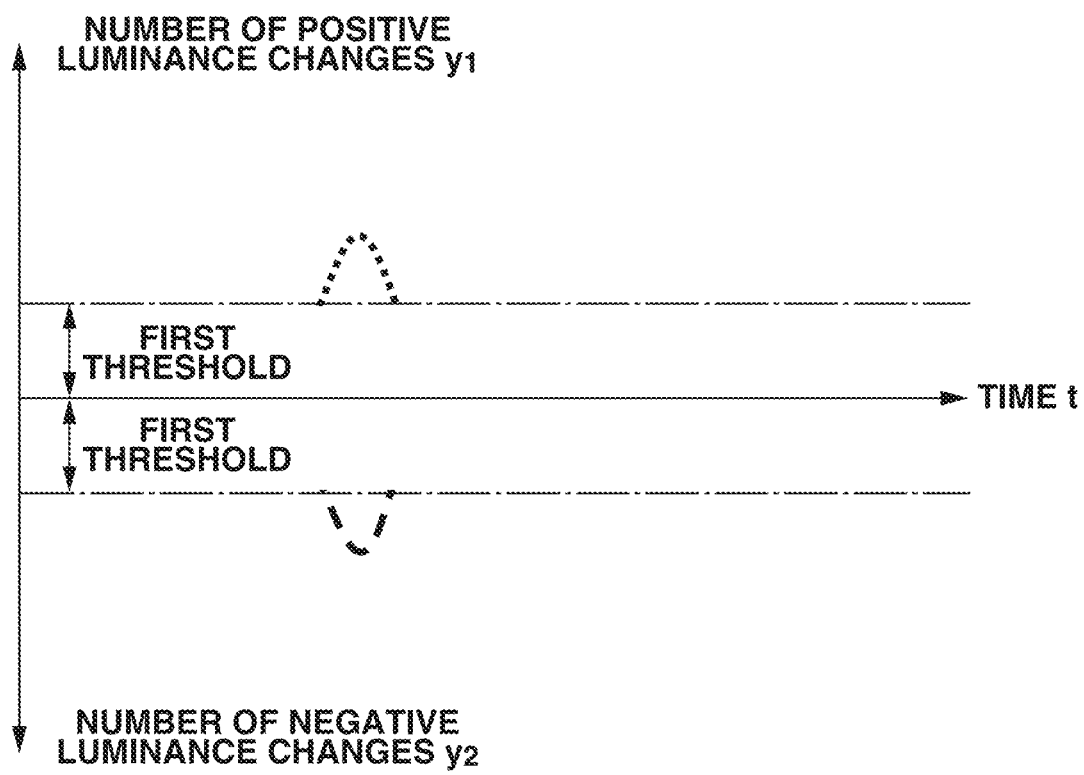
FIGS. 9A and 9B are each illustrating an example of display.
Figure 9B:
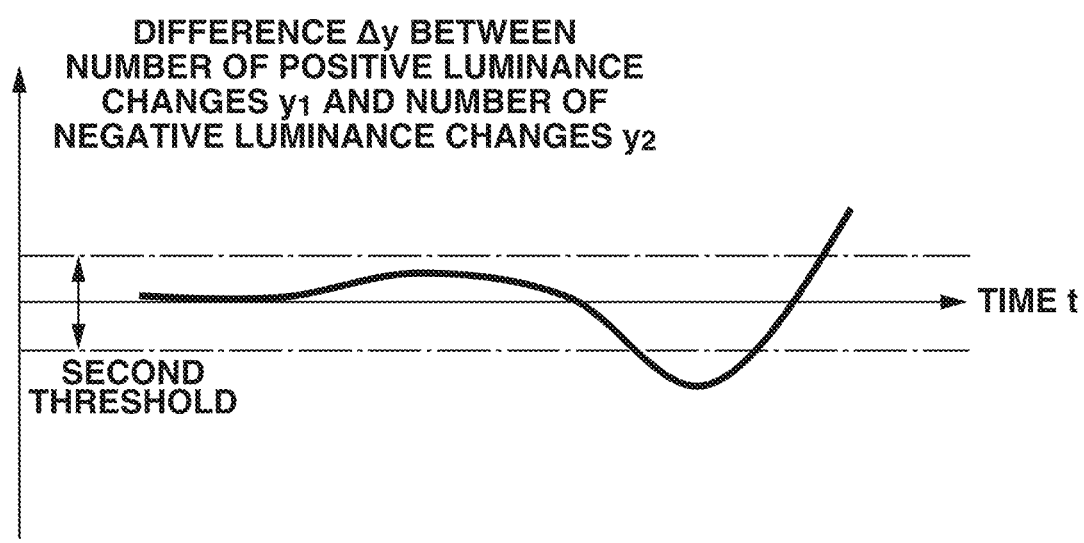

<Threshold for the Differences Between Positive and Negative Changes: FIGS. 9A and 9B>

In a use case for detection of intrusion or theft, there is a case in which the luminance changes due to variations in the illumination of the environmental light are not detected and the outputs caused by the movement of the subject are detected as specific events. As illustrated in FIG. 9B, it is displayed as to whether the differences between the number of positive luminance changes $y_1$ and the number of negative luminance changes $y_2$ are smaller than a second threshold. Further, as illustrated in FIG. 9A, only the luminance changes, in which absolute values of the number of positive luminance changes $y_1$ and the number of negative luminance changes $y_2$ are equal to or greater than the first threshold, are displayed. This makes it possible to detect the luminance changes due to the movement of the subject as abnormal phenomena, without detecting the luminance changes due to variations in the illumination of environmental light.

<Omission of Display of the Time Periods During Which No Luminance Change has Occurred>

In a case where the luminance changes to be displayed are limited by the thresholds as illustrated in FIGS. 6 and 9, the user will focus attention only on the time periods during which luminance changes has been exhibited. Thus, in one embodiment, a time scale for the time periods without luminance changes is displayed to be compressed more than the time scale for the time periods with luminance changes. That is, in a case where the number of luminance changes is smaller than a predetermined value during a certain time period, it can be displayed that an interval of the time scale for that time period is extended on the time axis. Alternatively, the display of the time periods during which the number of luminance changes is smaller than a predetermined value can be omitted. This allows the user to easily grasp the times when abnormal events may have occurred due to occurrences of luminance changes.

A display method can be changed focusing on a rate of the luminance change. As seen from FIG. 4, in a case where any object has passed in the screen at a constant speed, certain numbers of positive and negative luminance changes temporally occur. On the other hand, in a case where the speed of the object is not constant, the number of positive luminance changes and the number of negative luminance changes temporally vary. Therefore, displaying simultaneously the rate of positive luminance change and the rate of negative luminance change makes it easier to specify what abnormality has occurred.

<Flowchart>

Processing executed by the information processing apparatus 100 for displaying the above-described address event signal will be described. FIG. 10 is a flowchart of processing executed by the information processing apparatus 100. The processing illustrated in the flowchart of FIG. 10 is executed by the CPU 102 that is a computer, in accordance with computer programs stored in the memory 103. However, the information processing apparatus 100 may not necessarily perform all the steps described in the flowchart.

In step S1001, the information processing apparatus 100 initializes various settings. For example, the information processing apparatus 100 sets a time range in which the number of luminance changes is to be measured. The information processing apparatus 100 also sets the first threshold in accordance with photon count noise. For example, the information processing apparatus 100 acquires measurement results of the luminance changes without any moving body in a monitoring area, and acquires a value of an address event signal, which has been observed. Since the address event signal observed at this time highly possibly indicates noise, the information processing apparatus 100 sets the number of occurrences of noise as the first threshold. The method for setting the first threshold can be any other method. The user can set an arbitrary value of the first threshold. Next, in step S1002, the measurement unit 201 acquires an address event signal output by the event-based sensor 101. The address event signal includes addresses of the pixels having changed in luminance, directions of the luminance changes, and time information from which the times of the luminance changes can be specified. In step S1003, the measurement unit 201 measures the number of positive luminance changes (first measurement value) $y_1$ and the number of negative luminance changes (second measurement value) $y_2$ based on the address event signal. In step S1004, the determination unit 203 compares the measurement results with the preset first threshold to determine whether each of the number of positive luminance changes (first measurement value) $y_1$ and the number of negative luminance changes (second measurement value) $y_2$ is equal to or greater than the first threshold. For example, in a case where either the number of positive luminance changes (first measurement value) $y_1$ or the number of negative luminance changes (second measurement value) $y_2$ is equal to or greater than the threshold (YES in step S1004), the processing proceeds to step S1005. In a case where both the number of positive luminance changes (first measurement value) $y_1$ and the number of negative luminance changes (second measurement value) $y_2$ are smaller than the threshold (NO in step S1004), the processing proceeds to step S1006. At this time, since it is considered that no luminance change other than noise has occurred, the display of the time without luminance change can be skipped and the measurement results for the next time can be acquired. In this case, the processing returns to step S1002. In step S1005, the display control unit 202 plots the number of positive luminance changes (first measurement value) $y_1$ and the number of negative luminance changes (second measurement value) $y_2$ in association with the measurement times. Displaying separately the measurement results in accordance with the directions of the luminance change makes it easy to comprehend the occurrences of events. In step S1006, the information processing apparatus 100 determines whether to end the processing. The information processing apparatus 100 can determine that the processing is to be ended in response to an end instruction from the user or depending on whether the processing is finished on all the preset processing targets. In a case where the processing is not to be ended (NO in step S1006), the processing returns to step S1002.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-187449, filed Nov. 10, 2020, which is hereby incorporated by reference herein in its entirety.

What is claimed is:

1. An apparatus comprising:
   at least one processor; and
   a memory coupled to the at least one processor, the memory storing instructions that, when executed by the at least one processor, cause the at least one processor to:
   acquire a measurement result of a number of luminance changes, based on an address event signal indicating an address of a pixel having changed in luminance and a time; and
   cause a relationship between the time and the measurement result to be displayed,
   wherein the instructions cause the at least one processor to causes the measurement result to be displayed in accordance with a direction of the luminance changes,
   wherein a first measurement value indicating a number of luminance changes in a positive direction and a second measurement value indicating a number of luminance changes in a negative direction are acquired individually as the measurement result, and
   wherein the first measurement value and the second measurement value are displayed separately.

2. The apparatus according to claim 1, wherein the instructions cause the at least one processor to cause a graph to be displayed, the graph indicating the time on a horizontal axis and the measurement result on a vertical axis, and describing the first measurement value in the positive direction on the vertical axis and the second measurement value in the negative direction on the vertical axis.

3. The apparatus according to claim 1, wherein the instructions cause the at least one processor to cause a difference between the first measurement value and the second measurement value to be displayed.

4. The apparatus according to claim 1, wherein the instructions cause the at least one processor to causes the measurement result to be displayed
   in a case where the first measurement value or the second measurement value is equal to or greater than a first threshold, or
   in the case where a difference between the first measurement value and the second measurement value is less than a second threshold.

5. The apparatus according to claim 1,
wherein the instructions cause the at least one processor to accept a region of interest specified by a user, and acquires the measurement result from the address event signal corresponding to a pixel included in the region of interest among the address event signals.

6. The apparatus according to claim 1, wherein the measurement result is a number of the luminance changes measured in each pixel based on the address event signal.

7. The apparatus according to claim 1, wherein the measurement result is a number of luminance changes measured in a region larger than a predetermined size based on the address event signal.

8. The apparatus according to claim 1, wherein the instructions cause the at least one processor to causes the measurement result to be displayed with a change in a scale of the time in accordance with the measurement result.

9. The apparatus according to claim 8, wherein,
in a case where the measurement result is smaller than a predetermined value, the control unit causes the measurement result to be displayed so that an interval of the scale of the time is extended, or
in a case where the measurement result is less than a third threshold, the control unit causes the measurement result to be displayed without a measurement time of the measurement result.

10. The apparatus according to claim 1, wherein the instructions cause the at least one processor to acquires the measurement result of a number of luminance changes measured in a preset time range.

11. The apparatus according to claim 1, wherein the instructions cause the at least one processor to acquires the address event signal based on an event-based sensor configured to output a signal in accordance with a number of incident photons.

12. A non-transitory storage medium storing a program for causing a computer to execute a method, the method comprising:
acquiring a measurement result of a number of luminance changes, based on an address event signal indicating an address of a pixel having changed in luminance and a time; and
controlling for causing a relationship between the time and the measurement result to be displayed,
wherein the controlling includes causing the measurement result to be displayed in accordance with a direction of the luminance changes,
wherein a first measurement value indicating a number of luminance changes in a positive direction and a second measurement value indicating a number of luminance changes in a negative direction are acquired individually as the measurement result, and
wherein the first measurement value and the second measurement value are displayed separately.

13. The non-transitory storage medium according to claim 12
wherein the measurement result includes a first measurement value of a luminance change in a positive direction and a second measurement value of a luminance change in a negative direction, and
wherein the controlling causes the first measurement value and the second measurement value to be displayed.

14. The non-transitory storage medium according to claim 12, further comprising accepting a region of interest specified by a user,
wherein the acquiring acquires the measurement result from the address event signal corresponding to a pixel included in the region of interest among the address event signals.

15. The non-transitory storage medium according to claim 12, wherein the measurement result is a number of the luminance changes measured in each pixel based on the address event signal.

16. A method comprising:
acquiring a measurement result of a number of luminance changes, based on an address event signal indicating an address of a pixel having changed in luminance and a time; and
controlling for causing a relationship between the time and the measurement result to be displayed,
wherein the controlling includes causing the measurement result to be displayed in accordance with a direction of the luminance changes,
wherein a first measurement value indicating a number of luminance changes in a positive direction and a second measurement value indicating a number of luminance changes in a negative direction are acquired individually as the measurement result, and
wherein the first measurement value and the second measurement value are displayed separately.

17. The method according to claim 16,
wherein the measurement result includes a first measurement value of a luminance change in a positive direction and a second measurement value of a luminance change in a negative direction, and
wherein the controlling causes the first measurement value and the second measurement value to be displayed.

18. The method according to claim 16, further comprising accepting a region of interest specified by a user,
wherein the acquiring acquires the measurement result from the address event signal corresponding to a pixel included in the region of interest among the address event signals.

19. The method according to claim 16, wherein the measurement result is a number of the luminance changes measured in each pixel based on the address event signal.

* * * * *